Figure 1:
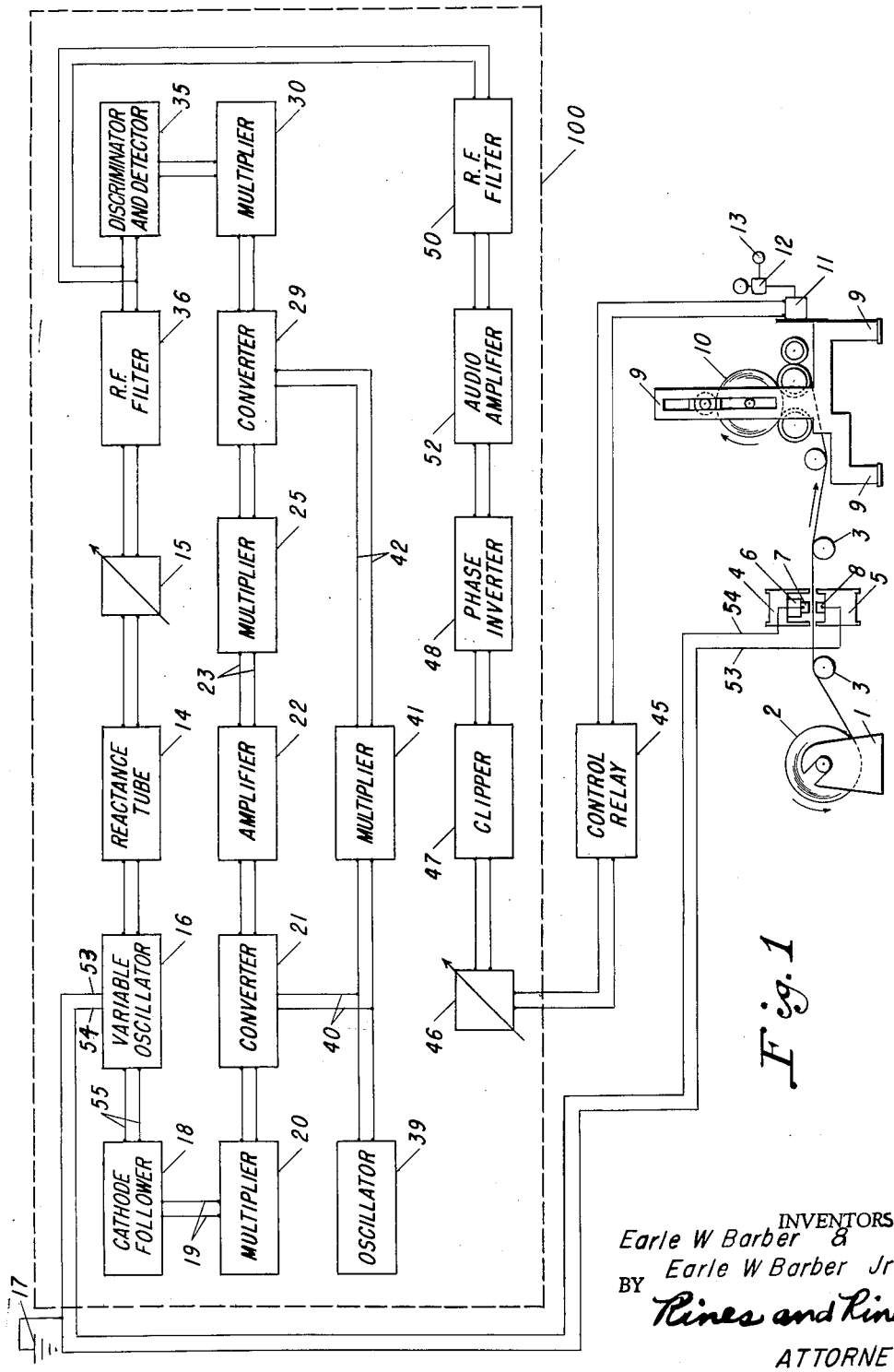

Feb. 6, 1962 E. W. BARBER ET AL 3,019,897
FLAW-DETECTING APPARATUS AND METHOD
Filed Dec. 31, 1957 2 Sheets-Sheet 1

INVENTORS
Earle W Barber &
Earle W Barber Jr
BY Rines and Rines
ATTORNEYS

Feb. 6, 1962 E. W. BARBER ET AL 3,019,897
FLAW-DETECTING APPARATUS AND METHOD
Filed Dec. 31, 1957 2 Sheets-Sheet 2
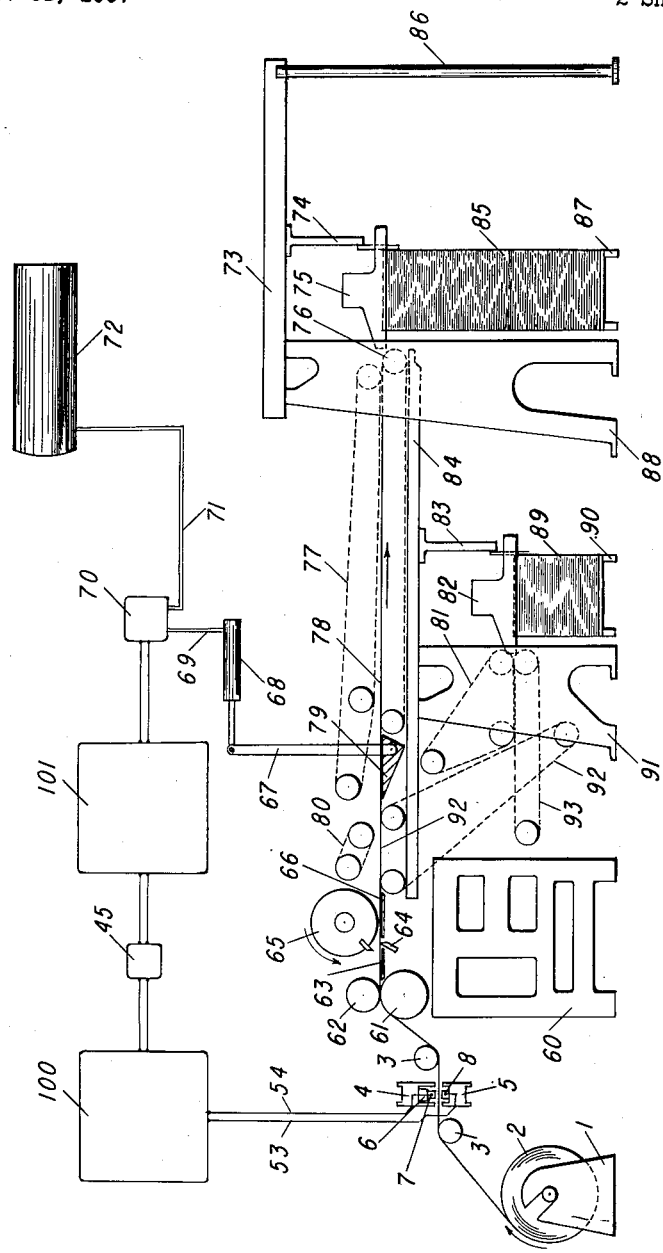
INVENTORS
Earle W. Barber &
Earle W. Barber Jr.
BY
Rines and Rines
ATTORNEYS

United States Patent Office 3,019,897
Patented Feb. 6, 1962

3,019,897
FLAW-DETECTING APPARATUS AND METHOD
Earle W. Barber and Earle W. Barber, Jr., Westerly, R.I., assignors, by mesne assignments, of one-half to Julian W. Maxson, one-fourth to Louis L. Matthews, and one-fourth to Joseph A. Clancy
Filed Dec. 31, 1957, Ser. No. 706,520
23 Claims. (Cl. 209—81)

The present invention relates to electrical apparatus for and methods of detecting flaws, imperfections or variations in sheet material, such as paper and the like.

It has heretofore been proposed to detect imperfections in paper and other dielectric or insulating material by means of a balanced electrical bridge or similar circuit containing in one arm a capacitive element between the plates of which the paper or similar sheet material may be drawn. The balance of the circuit will be upset if flaws in the paper exist, since such flaws provide a variation in the dielectric medium between the capacitance plates and thus change the effective value of the capacitance and hence the balance of the circuit. Unfortunately, however, such proposals and related suggestions have not heretofore proved commercially feasible for use with paper and similar sheet material. Some of the reasons for this reside in the complexity of and delicate adjustments required in the balanced circuitry, as well as the difficulty in providing a reliable control voltage of relatively sizable amplitude in response to signals of slight unbalance in the circuit, corresponding to the passage through the capacitor plates of slightly imperfect material.

An object of the present invention, accordingly, is to provide a new and improved imperfection or flaw-detecting apparatus and method of this character that shall not, however, be subjected to any of the above disadvantages; but that, to the contrary, shall supply reliable relatively large-amplitude control signals, even in response to the most minute discoloration flaws in paper and the like which have been discovered to result from chemical or physical variations in the paper that give rise to dielectric constant variations.

In summary, this result is attained through the use of an oscillator having an input circuit in which are connected the condenser plates through which the paper and the like is to pass and an output circuit connected to frequency multiplying means for multiplying the deviations in frequency produced in the input circuit by the imperfections in the paper and the like. In accordance with the invention, these multiplied deviations are preferably amplified, though without the disadvantages of high-frequency amplification, through successive beating and multiplying operations, thus to produce a relatively large amplitude control voltage from the amplified multiplied deviations.

A further object is to provide a new and improved capacitance-variation detecting apparatus that, while of broader usefulness, is particularly adapted for the above-mentioned flaw-detecting functions.

Still an additional object is to provide a new and improved frequency-variation detecting apparatus of more general utility.

Other and further objects will be explained hereinafter and will be more particularly pointed out in the appended claims.

The invention will now be described in connection with the accompanying drawing FIG. 1 of which is a side elevation of paper winding apparatus, shown connected to an electric circuit that is illustrated in block-diagram form, for detecting imperfections or flaws in the paper in accordance with a preferred embodiment; and FIG. 2 is a similar view of a modification adapted for use with a paper cutting and stacking machine.

Referring to FIG. 1, a roll of paper 2, to be scanned for imperfections or flaws, is shown supported upon a backstand 1 and fed as a web over transversely extending scanner guide rolls 3 to a rewind-roll 10 carried by a rewind unit 9. In the scanning or inspection area between the guide rolls 3, a scanning head is disposed comprising upper and lower transverse scanner bars 7 and 8 carried, respectively, by an insulator 6 and upper bar support shield 4, and a lower bar support 5. The paper web 2 is passed between the upper and lower scanner bars 7 and 8 to serve as part of the dielectric medium between the capacitive electrodes or plates formed by the upper and lower scanner assembly. Any imperfections or variations from standard properties in the paper drawn by the rewind roll 10 from the main roll 2 through the scanner assembly 4—7; 5—8, will thus alter the effective capacitance of that assembly.

In accordance with the present invention, the capacitance elements 4—7, 5—8 are coupled by respective conductors 54 and 53 to the oscillating circuit, preferably to the input, of a radio-frequency oscillator 16 of any desired variable type, operating at, for example, a frequency of approximately three megacycles. The conductor 53, connected to the lower scanner bar, is preferably grounded, as at 17. The output of the oscillator 16 is preferably fed by conductors 55, to the left, to a cathode follower output stage 18 which, in turn, connects by conductors 19 with the input circuit of a first frequency multiplier stage 20, which may, for example, triple the three-megacycle frequency to a frequency of nine megacycles.

If, accordingly, imperfections or flaws in the paper web 2 alter the capacitance at the scanner head 4—7, 5—8 to vary the three-megacycle frequency of the oscillator 16 a very small amount $\Delta f$, this deviation in frequency, representative of a flaw or imperfection, will appear in the output of the multiplier 20 as a greater frequency deviation $3\Delta f$. Since a strong-ampltiude control signal is ultimately desired, it is necessary to amplify the signal strength of this nine-megacycle frequency with its frequency deviation $3\Delta f$. To do so at the high nine-megacycle frequency, however, introduces the well-known stability, shielding and other difficulties inherent in trying to amplify very high radio frequencies.

In accordance with a preferred feature of the present invention, therefore, the multiplied nine-megacycle frequency with its deviation $3\Delta f$ is reduced to a lower more easily amplified frequency by beating it with locally generated oscillations of a slightly different frequency. The resulting lower beat frequency is then again multiplied to increase the frequency deviation and amplify the signal strength. Successive processes of multiplying, beating and multiplying will thus produce a highly amplified signal strength and wide frequency deviation.

In FIG. 1, the beating of the nine-megacycle signal from the tripler multiplier 20 takes place in a first converter or mixer stage 21 into which seven megacycle local oscillations are fed by conductors 40 from a preferably crystal-controlled or other fixed oscillator 39, thereby producing a two-megacycle beat frequency in the output of the converter 21. This lower-frequency two-megacycle beat with the wider frequency deviation $3\Delta f$ can then easily be amplified by one or more amplifier stages 22, shown to the right. The amplified beat signal may then be fed by conductors 23 to one or more further frequency multiplier stages, such as a pair of successive quadruplers 25, producing a thirty-two megacycle frequency with still a wider frequency deviation $48\Delta f$. The thirty-two megacycle signal is then mixed in the second converter 29 with twenty-eight megacycle oscillations fed by conductors 42 from the oscillator 39 and its quadrupler multiplier 41. The resulting four-megacycle beat with its wide 48Δf frequency deviation can then be amplified in further multipliers, such as the successive tripler and doubler multipliers 30, to produce a high-amplitude twenty-four megacycle frequency with an extremely wide frequency deviation of 288Δf, corresponding to the original slight frequency deviation Δf produced by the flaw in the paper web 2. Discrimination in a conventional twenty-four megacycle frequency-discriminator to produce a continuous-wave wave form of peak amplitude related to the deviation from the predetermined multiplied initial frequency standard, which wave form becomes unidirectionalized in the detection circuit 35, will result in a preferably audio frequency being separated out, corresponding to the very wide, highly amplified frequency deviation 288Δf, all radio frequency components being removed by the radio-frequency filter 50. This audio frequency, representing the presence of a flaw or imperfection in the sheet 2, may be amplified in one or more variable gain audio-frequency amplifier stages 52, and fed, to the left, through a phase inverter 48 and positive pulse clipper 47 to operate a control relay 45 that energizes a signal control relay 11 and an alarm 12. The alarm 12 may be an audible buzzer. Alternatively or supplementarily, a visual indicator 13 of any desired type may also be employed.

The size of the clipped pulses fed to the control relay 45 may be controlled, as by the clipper-stage gain control 46, connected between the clipper 47 and the relay 45 in order to provide adjustment for the amplitude level of the clipped substantially rectangular wave-form pulses fed to the relay 45 from the phase inverter 48, so that background variations in the paper caused by normal paper grain will not produce an interference effect by energizing the control relay 45. Suitable closed-loop frequency control (via elements 35—36—15—14, to the left) for the variable oscillator 16 may also be provided by feeding the detected frequency deviation through a radio-frequency filter 36 and a variable time delay network or other device 15 to a reactance tube 14 that controls the center frequency of the oscillator 16. By varying the delay of the network or device 15, therefore, the oscillator may be controlled to adjust its frequency to compensate for deviations produced by, for example, holes in the paper 2 of a predetermined size or sizes, so that no net deviation results for certain-size holes, if such an end is desired.

The operator, hearing or viewing the alarm at 12 or 13 may then mark the sheet 2 with an appropriate tag or mark, so that when the roll 10 is used, the user may visually be alerted to the imperfect portions of the web 2.

Where it is not desired to rewind a marked roll 10, the flaw detector of the present invention may be directly employed on the main web 2, as in a sheet cutter and stacker, FIG. 2, with apparatus for rejecting sheets that have been detected to be imperfect. The web 2 is fed directly through the flaw-detector head 4—7, 5—8 between draw and squeeze rolls 61, 62, mounted upon a cutter side frame 60. The web continues over a guide or "doctor" board 63 between a stationary bed-knife cutter 64 and a rotary cutter 65 that cuts the web into separate sheets, passing them over a further guide or "doctor" board 66. The sheets then proceed between delivery tapes 92 and 80, over a reject gate switch 79 and between delivery tapes 77 and 78, over a delivery roll 76 to a successively lowered main layboy skid area 87, where they may be received and stacked, as in the pile 85, being jogged by side jogger blades 75 and a jogger back stop 74 between side rails 73 that are supported between forward and rearward supports 83 and 86. Further details of the mechanisms for operating the layboy, the aligning jogger blades, etc. are not shown in order not to detract from the details of novelty herein, but they may be found, for example, in prior United States Letters Patent Nos. 2,261,972 and 2,367,416 issued, respectively, on November 11, 1941, and January 16, 1945, to Louis L. Matthews.

When the complete flaw-detecting system 100 of FIG. 1 is energized to operate the control relay 45, any well-known memory or delay circuit 101 will, in the time required for the defective sheet to reach the gate switch 79, energize an electro-pneumatic valve 70, permitting compressed air from a supply tank 72 to pass along the line 71 to an air line 69 of an air cylinder 68. The air cylinder 68 will then operate, pivoting the reject gate bell crank 67 and tilting the reject gate switch 79 downward, causing the defective sheet automatically to be diverted between delivery tapes 92 and 81, and then between tapes 81 and 93 to the reject layboy skid area 90, with its side jogger blades 82 and rear jogger blades 83 supported from the side rail 84 carried between the side frames 88 and 91.

While the invention has been described in connection with paper sheets, it is clear that it is equally applicable with sheets of cardboard, fabrics, plastics and other dielectric materials, also, to mention but a few. Further modifications will occur to those skilled in the art and all such are considered to fall within the spirit and scope of the invention as defined in the appended claims.

What is claimed is:

1. Apparatus for detecting imperfections in a traveling paper web and the like having, in combination, capacitive means, means for causing the web to travel past the capacitive means, an oscillator of predetermined frequency to which the capacitive means is coupled and having an output circuit, means for multiplying the frequency of the output circuit to multiply, also, any deviation in frequency from the predetermined oscillator frequency produced by imperfections in the paper, a frequency discriminator for separating out the multiplied frequency deviation, means for producing a control signal from the separated deviation, and means for adjusting the last-named means to compensate for any deviation produced by the interference of the paper grain.

2. Apparatus for detecting imperfections in a traveling paper web and the like having, in combination, capacitive means, means for causing the web to travel past the capacitive means, an oscillator of predetermined frequency to which the capacitive means is coupled and having an output circuit, means for multiplying the frequency of the output circuit to multiply, also, any deviation in frequency from the predetermined oscillator frequency produced by imperfections in the paper, a frequency discriminator for separating out the multiplied frequency deviation, means including audio amplifier means, clipper means and control relay means for producing a control signal from the separated deviation, and means for adjusting the last-named means to compensate for any deviation produced by the interference of the paper grain.

3. Apparatus for detecting imperfections in a traveling paper web and the like having, in combination, capacitive means, means for causing the web to travel past the capacitive means, an oscillator of predetermined frequency to which the capacitive means is coupled and having an output circuit, means for successively first multiplying the frequency of the output circuit to multiply, also, any deviation in frequency from the predetermined oscillator frequency produced by imperfections in the paper and then beating the multiplied oscillations with different-frequencied oscillations and amplifying the resulting beat oscillations containing the multiplied frequency deviation, a discriminator for separating out the amplified and multiplied frequency deviation, means for producing a control signal from the separated deviation, and means for adjusting the last-named means to compensate for any deviation produced by the interference of the paper grain.

4. Apparatus for detecting imperfections in a traveling paper web and the like having, in combination, capacitive means, means for causing the web to travel past the capacitive means, an oscillator of predetermined frequency to which the capacitive means is coupled and having an output circuit, means for successively first multiplying the frequency of the output circuit to multiply, also, any deviation in frequency from the predetermined oscillator frequency produced by imperfections in the paper and then beating the multiplied oscillations with different-frequencied oscillations and amplifying the resulting beat oscillations containing the multiplied frequency deviation, a discriminator for separating out the amplified and multiplied frequency deviation, means including audio amplifier means, clipper means and control relay means for producing a control signal from the separated deviation, and means for adjusting the last-named means to compensate for any deviation produced by the interference of the paper grain.

5. Apparatus for detecting imperfections in a traveling paper web and the like having, in combination, capacitive means, means for causing the web to travel past the capacitive means, an oscillator of predetermined frequency to which the capacitive means is coupled and having an output circuit, means for multiplying the frequency of the output circuit to multiply, also, any deviation in frequency from the predetermined oscillator frequency produced by imperfections in the paper, a frequency discriminator for separating out the multiplied frequency deviation, means for utilizing the separated deviation, and means comprising a feed-back circuit for reacting upon the oscillator to control the size of imperfections to be detected.

6. Apparatus for detecting imperfections in a traveling paper web and the like having, in combination, capacitive means, means for causing the web to travel past the capacitive means, an oscillator of predetermined frequency to which the capacitive means is coupled and having an output circuit, means for multiplying the frequency of the output circuit to multiply, also, any deviation in frequency from the predetermined oscillator frequency produced by imperfections in the paper, a frequency discriminator for separating out the multiplied frequency deviation, means for utilizing the separated deviation, and means comprising a time-delay device and reactance means connected between the discriminator and the oscillator for reacting upon the oscillator to control the size of imperfections to be detected.

7. Apparatus for detecting imperfections in a traveling paper web and the like having, in combination, capacitive means, means for causing the web to travel past the capacitive means, an oscillator of predetermined frequency to which the capacitive means is coupled and having an output circuit, means for successively first multiplying the frequency of the output circuit to multiply, also, any deviation in frequency from the predetermined oscillator frequency produced by imperfections in the paper and then beating the multiplied oscillations with different-frequencied oscillations and amplifying the resulting beat oscillations containing the multiplied frequency deviation, a discriminator for separating out the amplified and multiplied frequency deviation, means for utilizing the separated deviation, and means comprising a feed-back circuit for reacting upon the oscillator to control the size of imperfections to be detected.

8. Apparatus for detecting imperfections in a traveling paper web and the like having, in combination, capacitive means, means for causing the web to travel past the capacitive means, an oscillator of predetermined frequency to which the capacitive means is coupled and having an output circuit, means for successively first multiplying the frequency of the output circuit to multiply, also, any deviation in frequency from the predetermined oscillator frequency produced by imperfections in the paper and then beating the multiplied oscillations with different-frequencied oscillations and amplifying the resulting beat oscillations containing the multiplied frequency deviation, a discriminator for separating out the amplified and multiplied frequency deviation, means for utilizing the separated deviation, and means comprising a time-delay device and reactance means connected between the discriminator and the oscillator for reacting upon the oscillator to control the size of imperfections to be detected.

9. Apparatus as claimed in claim 1 and in which there is provided means for indicating the existence of such control signal, and means for winding up the detected web.

10. Apparatus as claimed in claim 1 and in which there is provided means for cutting the detected traveling web into sheets, means for carrying the sheets along a predetermined direction to a sheet-receiving area, and means responsive to the separated frequency deviation control signal for diverting the sheet the imperfection in which produced the frequency deviation.

11. Apparatus as claimed in claim 1 and in which there is provided means for cutting the detected traveling web into sheets, means for carrying the sheets over a predetermined surface along a predetermined direction to a sheet-stacking area, and means responsive to the separated frequency deviation control signal for deflecting the predetermined surface along a different direction in order to divert the sheet the imperfection in which produced the frequency deviation.

12. Apparatus as claimed in claim 1 and in which there is provided means for cutting the detected traveling web into sheets, means comprising moving tapes for carrying the sheets over a switching gate along a predetermined direction to a sheet-stacking layboy and the like, means responsive to the separated frequency deviation control signal for producing a control signal, and means operable in response to the control signal for actuating the switching gate to divert the sheet the imperfection in which produced the frequency deviation.

13. Apparatus as claimed in claim 1 and in which there is provided means for cutting the detected traveling web into sheets, means for carrying the sheets over a switching gate along a predetermined direction to a sheet-receiving area, means responsive to the separated frequency deviation control signal for delaying the control signal a period of time corresponding to that consumed by the travel of the detected imperfect sheet to the switching gate, and means for thereupon causing the control signal to actuate the switching gate in order to divert the imperfect sheet.

14. Apparatus as claimed in claim 1 and in which there is provided means for cutting the detected traveling web into sheets, means comprising moving tapes for carrying the sheets over a switching gate along a predetermined direction to a sheet-stacking layboy and the like, means responsive to the separated frequency deviation control signal and comprising a compressed-air-operated drive operable in response to the control signal for actuating the switching gate to divert the sheet the imperfection in which produced the frequency deviation.

15. Apparatus as claimed in claim 1 and in which there is provided means for cutting the detected traveling web into sheets, means comprising moving tapes for carrying the sheets over a switching gate along a predetermined direction to a sheet-stacking layboy and the like, means responsive to the separated frequency deviation control signal comprising a compressed-air-operated drive operable in response to the control signal for actuating the switching gate to divert the sheet the imperfection in which produced the frequency deviation, and means comprising further tapes for carrying the diverted sheet to a further sheet-stacking layboy and the like.

16. Apparatus as claimed in claim 5 and in which there is provided means for cutting the detected traveling web into sheets, means for carrying the sheets along a predetermined direction to a sheet-receiving area, and means responsive to the separated frequency deviation utilizing means for diverting the sheet the imperfection in which produced the frequency deviation.

17. Apparatus as claimed in claim 5 and in which there is provided means for cutting the detected traveling web into sheets, means for carrying the sheets over a predetermined surface along a predetermined direction to a sheet-stacking area, and means responsive to the separated frequency deviation utilizing means for deflecting the predetermined surface along a different direction in order to divert the sheet the imperfection in which produced the frequency deviation.

18. Apparatus as claimed in claim 5 and in which there is provided means for cutting the detected traveling web into sheets, means comprising moving tapes for carrying the sheets over a switching gate along a predetermined direction to a sheet-stacking layboy and the like, means responsive to the separated frequency deviation utilizing means for producing a control signal, and means operable in response to the control signal for actuating the switching gate to divert the sheet the imperfection in which produced the frequency deviation.

19. Apparatus as claimed in claim 5 and in which there is provided means for cutting the detected traveling web into sheets, means for carrying the sheets over a switching gate along a predetermined direction to a sheet-receiving area, means responsive to the separated frequency deviation utilizing means for producing a control signal, means for delaying the control signal a period of time corresponding to that consumed by the travel of the detected imperfect sheet to the switching gate, and means for thereupon causing the control signal to actuate the switching gate in order to divert the imperfect sheet.

20. Apparatus as claimed in claim 5 and in which there is provided means for cutting the detected traveling web into sheets, means comprising moving tapes for carrying the sheets over a switching gate along a predetermined direction to a sheet-stacking layboy and the like, means responsive to the separated frequency deviation utilizing means for producing a control signal, and means comprising a compressed-air-operated drive operable in response to the control signal for actuating the switching gate to divert the sheet the imperfection in which produced the frequency deviation.

21. Apparatus as claimed in claim 5 and in which there is provided means for cutting the detected traveling web into sheets, means comprising moving tapes for carrying the sheets over a switching gate along a predetermined direction to a sheet-stacking layboy and the like, and means comprising further tapes for carrying the diverted sheet to a further sheet-stacking layboy and the like.

22. Apparatus for detecting imperfections in a traveling paper web and the like having, in combination, capacitive means, means for causing the web to travel past the capacitive means, an oscillator of predetermined frequency to which the capacitive means is coupled and having an output circuit, means for multiplying the frequency of the output circuit to multiply, also, any deviation in frequency from the predetermined oscillator frequency produced by imperfections in the paper, a frequency discriminator for separating out the multiplied frequency deviation, means for cutting the detected traveling web into sheets, means for carrying the sheets along a predetermined direction to a sheet-receiving area, means responsive to the separated frequency deviation for diverting the sheet the imperfection in which produced the frequency deviation, and means for reacting upon the oscillator to control the size of imperfections to be detected.

23. Apparatus for detecting imperfections in a traveling paper web and the like having, in combination, capacitive means, means for causing the web to travel past the capacitive means, an oscillator of predetermined frequency to which the capacitive means is coupled and having an output circuit, means for multiplying the frequency of the output circuit to multiply, also, any deviation in frequency from the predetermined oscillator frequency produced by imperfections in the paper, a frequency discriminator for separating out the multiplied frequency deviation, means for cutting the detected traveling web into sheets, means comprising moving tapes for carrying the sheets over a switching gate along a predetermined direction to a sheet-stacking layboy and the like, means responsive to the separated frequency deviation for producing a control signal, means operable in response to the control signal for actuating the switching gate to divert the sheet the imperfection in which produced the frequency deviation, and means for adjusting the control-signal-producing means to compensate for any deviation produced by the interference of the paper grain.

References Cited in the file of this patent

UNITED STATES PATENTS

| | | |
|---|---|---|
| 2,337,328 | Hathaway | Dec. 21, 1943 |
| 2,393,717 | Speaker | Jan. 29, 1946 |
| 2,399,582 | Stevens | Apr. 30, 1946 |
| 2,423,103 | Koechlin | July 1, 1947 |
| 2,516,768 | Grob et al. | July 25, 1950 |
| 2,568,132 | Spacek | Sept. 18, 1951 |
| 2,607,830 | Razek | Aug. 19, 1952 |
| 2,613,249 | Babb | Oct. 7, 1952 |
| 2,632,792 | Selz | Mar. 24, 1953 |
| 2,768,629 | Maul | Oct. 30, 1956 |
| 2,806,204 | Rothacker | Sept. 10, 1957 |
| 2,920,272 | Erdman et al. | Jan. 5, 1960 |

OTHER REFERENCES

"Instruments" (vol. 24), December 1951.